United States Patent
Masuda et al.

(10) Patent No.: US 9,545,904 B2
(45) Date of Patent: Jan. 17, 2017

(54) BRAKING CONTROL DEVICE FOR VEHICLE

(75) Inventors: Yoshio Masuda, Kariya (JP); Hiroaki Niino, Toyota (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 516 days.

(21) Appl. No.: 13/984,171

(22) PCT Filed: Feb. 16, 2012

(86) PCT No.: PCT/JP2012/053610
§ 371 (c)(1),
(2), (4) Date: Aug. 7, 2013

(87) PCT Pub. No.: WO2012/111730
PCT Pub. Date: Aug. 23, 2012

(65) Prior Publication Data
US 2013/0318963 A1 Dec. 5, 2013

(30) Foreign Application Priority Data
Feb. 18, 2011 (JP) .................... 2011-033948

(51) Int. Cl.
*B60T 11/16* (2006.01)
*B60T 8/40* (2006.01)
(Continued)

(52) U.S. Cl.
CPC ............. *B60T 11/16* (2013.01); *B60T 7/042* (2013.01); *B60T 8/4077* (2013.01); *B60T 8/4086* (2013.01);
(Continued)

(58) Field of Classification Search
CPC ...... B60T 13/147; B60T 13/12; B60T 11/16; B60T 8/4077; B60T 8/4086; B60T 8/409; B60T 8/4081; B60T 2270/604; B60T 7/042; B60T 11/20; B60T 13/145; B60T 13/146; B60T 13/662; B60T 13/686
See application file for complete search history.

(56) References Cited

U.S. PATENT DOCUMENTS

| 4,901,626 A | 2/1990 | Zingel et al. |
| 5,359,854 A | 11/1994 | Wagner et al. |

(Continued)

FOREIGN PATENT DOCUMENTS

| CN | 1074182 A | 7/1993 |
| JP | 58-110568 | 7/1983 |
| JP | 59-128038 A | 7/1984 |
| JP | 5-105069 A | 4/1993 |
| JP | 5-178203 A | 7/1993 |
| JP | 2007-62614 A | 3/2007 |
| JP | 2007-196824 A | 8/2007 |

OTHER PUBLICATIONS

International Search Report (PCT/ISA/210) issued on May 22, 2012, by the Japanese Patent Office as the International Searching Authority for International Application No. PCT/JP2012/053610.
(Continued)

*Primary Examiner* — Logan Kraft
(74) *Attorney, Agent, or Firm* — Buchanan Ingersoll & Rooney PC

(57) ABSTRACT

The braking control device for a vehicle is adapted to be used for a vehicle brake device and it is an object of the present invention to prevent an operator of the vehicle from feeling of any an unpleasant feeling by reducing an ineffective operating amount by which no braking force increases in response to the increase of the brake operating amount. The braking control device includes a controlling portion for changing a servo performance to an ineffective operating amount reducing servo performance which is closer to the increase ratio of the hydraulic pressure braking force relative to the increase of the brake operating amount after the input piston has been in contact with the output piston when the brake operating amount reaches to the servo performance change operating amount which is smaller than the assisting limit operating amount.

6 Claims, 6 Drawing Sheets

(51) Int. Cl.
  *B60T 13/14* (2006.01)
  *B60T 7/04* (2006.01)
  *B60T 11/20* (2006.01)
  *B60T 13/66* (2006.01)
  *B60T 13/68* (2006.01)

(52) U.S. Cl.
  CPC .............. *B60T 11/20* (2013.01); *B60T 13/145* (2013.01); *B60T 13/146* (2013.01); *B60T 13/147* (2013.01); *B60T 13/662* (2013.01); *B60T 13/686* (2013.01); *B60T 2270/604* (2013.01)

(56) References Cited

U.S. PATENT DOCUMENTS 6,457,785 B1 * 10/2002 Yonemura .............. B60T 7/042
    303/113.4
2008/0185241 A1    8/2008 Isono et al.

OTHER PUBLICATIONS

Office Action issued on Feb. 4, 2015, by the Chinese Patent Office in corresponding Chinese Patent Application No. 201280008023.6. (7 pages).

* cited by examiner

BRAKING CONTROL DEVICE FOR VEHICLE

TECHNICAL FIELD

This invention relates to a braking control device for a vehicle for controlling braking force applied to a vehicle in response to a brake operating amount and more particularly to a vehicle braking control device which can reduce an ineffective brake operating amount that cannot increase a braking force generated by a depression of a brake pedal by an operator of the vehicle in a high deceleration speed zone.

BACKGROUND OF THE TECHNOLOGY

Conventionally, as an example of the vehicle braking control device is shown in a Patent Document 1. According to this braking control device disclosed in this document, the pressurized fluid is supplied to a wheel cylinder which applies braking force to a wheel of the vehicle by providing an input piston and an output piston in a cylinder, the pistons being slidable within the cylinder and the input piston pushing the output piston, wherein the output piston receives an operating hydraulic pressure in response to the operating amount of a brake pedal which is operatively connected to the input piston when an electric source is in normal state. If the electric source is powered off, the output piston is directly pushed by the brake pedal through the input piston to supply the wheel cylinder with the hydraulic pressure braking force in proportion to the brake pedal depression amount. Thus, the braking force is applied to the vehicle wheels properly to improve the safe braking operation.

DOCUMENT LIST OF STATE OF ART

Patent Document

Patent Document 1: JP2007-62614 A

DISCLOSURE OF INVENTION

Problems to be Solved

However, according to the vehicle braking control device disclosed in the above Patent Document 1, as is shown in FIG. 7 of this application, while the brake operating amount S is increased to the amount S2 from the amount S0, the target operating hydraulic pressure Pt is increasing with a servo performance along the performance line indicated with a solid line Pt1 relative to the brake operating amount S. When the brake operating amount becomes the value S2 by depressing the brake pedal in the high deceleration speed area, the target operating hydraulic pressure Pt reaches to the value of assisting limit operating hydraulic pressure Ptm and accordingly, until the input piston is brought into contact with the output piston, the brake operating amount enters into an ineffective operating amount Bb area where the operating hydraulic pressure P would not increase even the brake pedal operating amount S increases. Thereafter, when the input piston directly pushes the output piston and the operating hydraulic pressure P increases in response to the depression force of the operator of the vehicle.

Under the brake pedal being depressed in the area of high deceleration speed, if the brake operating operation under the ineffective operating amount Bb continues longer, the operator of the vehicle feels the braking operation to be in an abnormal state, because the operating hydraulic pressure P, i.e., the vehicle braking force, does not increase, even the brake operating amount S increases during this time.

The present invention was made in consideration with the above problems and the object of the invention is to provide a vehicle braking control device which would not have the operator of the vehicle feel uncomfortable by reducing the ineffective operating amount as small as possible which does not increase the braking hydraulic pressure to the wheel cylinder upon increase operation of the brake operating amount.

Means For Solving the Problem

The feature in structure of the invention according to a first aspect of the invention, made for solving the above problem is characterized in that the braking control device for a vehicle is adapted to a vehicle brake device and comprises a master cylinder having an input piston which is slidable in a cylinder portion in cooperation with an operation of a brake operating member and an output piston which slidably moves in the cylinder portion by contacting with or separating from the input piston by the operation of the brake operating member and a driving hydraulic pressure adjusting device connected to a driving hydraulic pressure chamber formed in the master cylinder for adjusting a driving hydraulic pressure which is a hydraulic pressure in the driving hydraulic pressure chamber not to exceed a predetermined assisting limit hydraulic pressure. The braking control device further includes a master hydraulic pressure in a master hydraulic pressure chamber formed in the master cylinder the master hydraulic pressure varies when the output piston slidably moves within the cylinder portion by the driving hydraulic pressure under a state that the input piston is separated from the output piston and varies when the input piston and the output piston slidably move within the cylinder portion in cooperation with the operation of the brake operating member under a state that both input is in contact with the output piston, wherein the driving hydraulic pressure adjusting device controls to adjust the driving hydraulic pressure so that the output piston is separated from the input piston when the driving hydraulic pressure is below the predetermined assisting limit hydraulic pressure. The vehicle braking control device further includes a brake operating amount detecting portion for detecting an operating amount of the brake operating member and a driving hydraulic pressure control means for controlling the driving hydraulic pressure by the driving hydraulic pressure adjusting device based on a first servo performance which is a predetermined value of an increased amount of the driving hydraulic pressure relative to an increased amount of a brake operating amount when the brake operating amount which is the operating amount of the brake operating member detected by the brake operating amount detecting means is below a predetermined servo performance change operating amount and controlling the driving hydraulic pressure by the driving hydraulic pressure adjusting device based on a second servo performance in which the increased amount of the driving hydraulic pressure relative to the increased amount of the brake operating amount is smaller than the second servo performance, when the brake operating amount is equal to or more than the servo performance change operating amount. Further, according to the structure of the invention, the servo performance change operating amount is set to be a smaller operating amount than the assisting limit operating amount which corresponds to the operating amount of the brake operating member under a state that the driving hydraulic pressure becomes the predetermined assisting limit hydraulic pressure, when the driving hydraulic pressure is increased in response to an increase of the brake operating amount based on the first servo performance, regardless of the brake operating amount.

The feature in structure of the invention according to a second aspect of the invention, is characterized in that the braking control device further comprises a second servo performance setting means for setting a value of the second servo performance by calculating a pressure differential by subtracting the driving hydraulic pressure corresponding to the servo performance change operating amount from the assisting limit hydraulic pressure, calculating operating amount difference by subtracting the servo performance change operating amount from a contact brake operating amount which corresponds to the operating amount of the brake operating member from the state that the input piston is separated from the output piston to a time when the input piston is brought into contact with the output piston and dividing the pressure differential by the operating amount difference and the driving hydraulic pressure control means conducting a driving hydraulic pressure controlling in which the brake operating amount is equal to or more than the servo performance change operating amount, based on the value of the second servo performance set by the second servo performance setting means.

The feature in structure of the invention according to a third aspect of the invention, is characterized in that the braking control device for the vehicle further comprises a servo performance change operating amount setting means for setting the brake operating amount at an intersection between a performance line at the driving hydraulic pressure controlling based on the first servo performance and a performance line under the state that the input piston is in contact with the output piston under a performance relationship between the brake operating amount and the master hydraulic pressure as the servo performance change amount and the driving hydraulic pressure control means conducting the driving hydraulic pressure controlling based on the servo performance change operating amount set by the servo performance change operating amount setting means.

The feature in structure of the invention according to a fourth aspect of the invention, is characterized in that the braking control device for the vehicle comprises a master hydraulic pressure detecting means for detecting the master hydraulic pressure and a contact brake operating amount calculating means for calculating the contact brake operating amount based on the increased amount of the master hydraulic pressure detected by the master hydraulic pressure detecting means relative to the increased amount of the brake operating amount and the second servo performance setting means for setting the second servo performance based on the contact brake operating amount calculated by the contact brake operating amount calculating means.

The feature in structure of the invention according to a fifth aspect of the invention, is characterized in that the braking control device for the vehicle comprises a master hydraulic pressure detecting means for detecting the master hydraulic pressure and a contact brake operating amount calculating means for calculating the contact brake operating amount by calculating a fluid amount of a brake fluid driven out from the master hydraulic pressure chamber based on the master hydraulic pressure detected by the master hydraulic pressure detecting means and adding a predetermined value to a value obtained by dividing the fluid amount by a cross-section area of the output piston and the second servo performance setting means for setting the second servo performance based on the contact brake operating amount calculated by the contact brake operating amount calculating means.

The feature in structure of the invention according to a sixth aspect of the invention, is characterized in that the braking control device for the vehicle comprises a driving hydraulic pressure change judging means for judging whether the driving hydraulic pressure will reach to the assisting limit hydraulic pressure or not and the driving hydraulic pressure control means for changing the performance from the first servo performance to the second servo performance when the driving hydraulic pressure change judging means judges that the driving hydraulic pressure will reach to the assisting limit hydraulic pressure.

According to the braking control device for the vehicle according to the first aspect of the invention, the braking control device for a vehicle is adapted to a vehicle brake device, comprising a master cylinder having an input piston which is slidable in a cylinder portion in cooperation with an operation of a brake operating member and an output piston which slidably moves in the cylinder portion by contacting with or separating from the input piston by the operation of the brake operating member and a driving hydraulic pressure adjusting device connected to a driving hydraulic pressure chamber formed in the master cylinder for adjusting a driving hydraulic pressure which is a hydraulic pressure in the driving hydraulic pressure chamber not to exceed a predetermined assisting limit hydraulic pressure. According to the vehicle brake device above, a master hydraulic pressure which is a hydraulic pressure in a master hydraulic pressure chamber formed in the master cylinder varies when the output piston slidably moves within the cylinder portion by the driving hydraulic pressure under a state that the input piston is separated from the output piston and the master hydraulic pressure varies when the input piston and the output piston slidably move within the cylinder portion in cooperation with the operation of the brake operating member under a state that both input is in contact with the output piston. The vehicle braking control device adapted to the vehicle brake device, wherein the driving hydraulic pressure adjusting device controls to adjust the driving hydraulic pressure so that the output piston is separated from the input piston when the driving hydraulic pressure is below the predetermined assisting limit hydraulic pressure.

When the braking control device for the vehicle above is adapted to the vehicle brake device, the input piston movable in cooperation with the brake operating member approaches the output piston driven by the driving hydraulic pressure and eventually is brought into contact with the output piston in accordance with the increase of the operating amount of the brake operating member after the driving hydraulic pressure reached to the assisting limit hydraulic pressure. After the input piston is brought into contact with the output piston, both input and output pistons are operated in cooperation with the operation of the brake operating member. However, although the master hydraulic pressure increases, the output piston does not move in the cylinder although the brake operating amount increases after the driving hydraulic pressure reached to the assisting limit hydraulic pressure until the input piston moves to be in contact with the output piston. Accordingly, the master hydraulic pressure would not be varied and as a result, the operator of the vehicle feels an uncomfortable feeling that even the operator depresses the brake pedal the braking force does not increase in response to the increase of the brake operating force.

In responding to this problem, according to the first aspect of the invention, the driving hydraulic pressure is controlled by the driving hydraulic pressure adjusting device by providing a driving hydraulic pressure control means for controlling the driving hydraulic pressure by the driving hydraulic pressure adjusting device based on a first servo performance which is a predetermined value of an increased amount of the driving hydraulic pressure relative to an increased amount of a brake operating amount when the brake operating amount which is the operating amount of the brake operating member detected by the brake operating amount detecting means is below a predetermined servo performance change operating amount and controlling the driving hydraulic pressure by the driving hydraulic pressure adjusting device based on a second servo performance in which the increased amount of the driving hydraulic pressure relative to the increased amount of the brake operating amount is smaller than the second servo performance, when the brake operating amount is equal to or more than the servo performance change operating amount. Further, according to the structure of the invention, the servo performance change operating amount is set to be a smaller operating amount than the assisting limit operating amount which corresponds to the operating amount of the brake operating member under a state that the driving hydraulic pressure becomes the predetermined assisting limit hydraulic pressure, when the driving hydraulic pressure is increased in response to an increase of the brake operating amount based on the first servo performance, regardless of the brake operating amount.

Therefore, the operating amount of the brake operating member in which the driving hydraulic pressure reaches to the assisting limit hydraulic pressure becomes large compared to the case that the driving hydraulic pressure is increased according to the increase of the operating amount of the brake operating member based on the first servo performance regardless of the operating amount of the brake operating member and the operating amount of the brake operating member becomes small after the driving hydraulic pressure reached to the assisting limit hydraulic pressure until the input piston is brought into contact with the output piston. Thus, the uncomfortable feeling of the operator of the vehicle that the braking force does not increase in spite of the brake operating amount increasing operation by the brake operating member can be reduced.

According to the second aspect of the invention, the braking control device comprises a second servo performance setting means which sets a value of the second servo performance by calculating a pressure differential by subtracting the driving hydraulic pressure corresponding to the servo performance change operating amount from the assisting limit hydraulic pressure, calculating operating amount difference by subtracting the servo performance change operating amount from a contact brake operating amount which corresponds to the operating amount of the brake operating member from the state that the input piston is separated from the output piston to a time when the input piston is brought into contact with the output piston and dividing the pressure differential by the operating amount difference. The driving hydraulic pressure control means conducts a driving hydraulic pressure controlling in which the brake operating amount is equal to or more than the servo performance change operating amount, based on the value of the second servo performance set by the second servo performance setting means. Accordingly, the position that the brake operating amount reaches to the assisting limit hydraulic pressure can be appropriately set so that the ineffective operating amount can be minimized.

According to the third aspect of the invention, the braking control device comprises a servo performance change operating amount setting means for setting the brake operating amount at an intersection between a performance line at the driving hydraulic pressure controlling based on the first servo performance and a performance line under the state that the input piston is in contact with the output piston under a performance relationship between the brake operating amount and the master hydraulic pressure as the servo performance change amount. The driving hydraulic pressure control means conducting the driving hydraulic pressure controlling based on the servo performance change operating amount set by the servo performance change operating amount setting means. Accordingly, the position that the brake operating amount reaches to the assisting limit hydraulic pressure can be appropriately set so that the ineffective operating amount can be minimized.

According to the fourth aspect of the invention, the braking control device for the vehicle comprises a master hydraulic pressure detecting means for detecting the master hydraulic pressure and a contact brake operating amount calculating means for calculating the contact brake operating amount based on the increased amount of the master hydraulic pressure detected by the master hydraulic pressure detecting means relative to the increased amount of the brake operating amount. The second servo performance setting means sets the second servo performance based on the contact brake operating amount calculated by the contact brake operating amount calculating means. Accordingly, based on the second servo performance, the position that the brake operating amount reaches to the assisting limit hydraulic pressure can be appropriately set so that the ineffective operating amount can be minimized.

According to the fifth aspect of the invention, the braking control device for the vehicle comprises a master hydraulic pressure detecting means for detecting the master hydraulic pressure and a contact brake operating amount calculating means for calculating the contact brake operating amount by calculating a fluid amount of a brake fluid driven out from the master hydraulic pressure chamber based on the master hydraulic pressure detected by the master hydraulic pressure detecting means and adding a predetermined value to a value obtained by dividing the fluid amount by a cross-section area of the output piston. The second servo performance setting means sets the second servo performance based on the contact brake operating amount calculated by the contact brake operating amount calculating means. Accordingly, based on the second servo performance the position that the brake operating amount reaches to the assisting limit hydraulic pressure can be appropriately set so that the ineffective operating amount can be minimized.

According to the sixth aspect of the invention, the braking control device for the vehicle comprises a driving hydraulic pressure change judging means for judging whether the driving hydraulic pressure will reach to the assisting limit hydraulic pressure or not. The driving hydraulic pressure control means changes the performance from the first servo performance to the second servo performance when the driving hydraulic pressure change judging means judges that the driving hydraulic pressure will reach to the assisting limit hydraulic pressure. Accordingly, the operating amount of the brake operating member after the driving hydraulic pressure reached to the assisting limit hydraulic pressure until the input piston contacts with the output piston can be reduced by appropriately changing the first servo performance to the second servo performance.

BRIEF EXPLANATION OF ATTACHED DRAWINGS

THE EMBODIMENTS FOR IMPLEMENTING THE INVENTION

Figure 1:
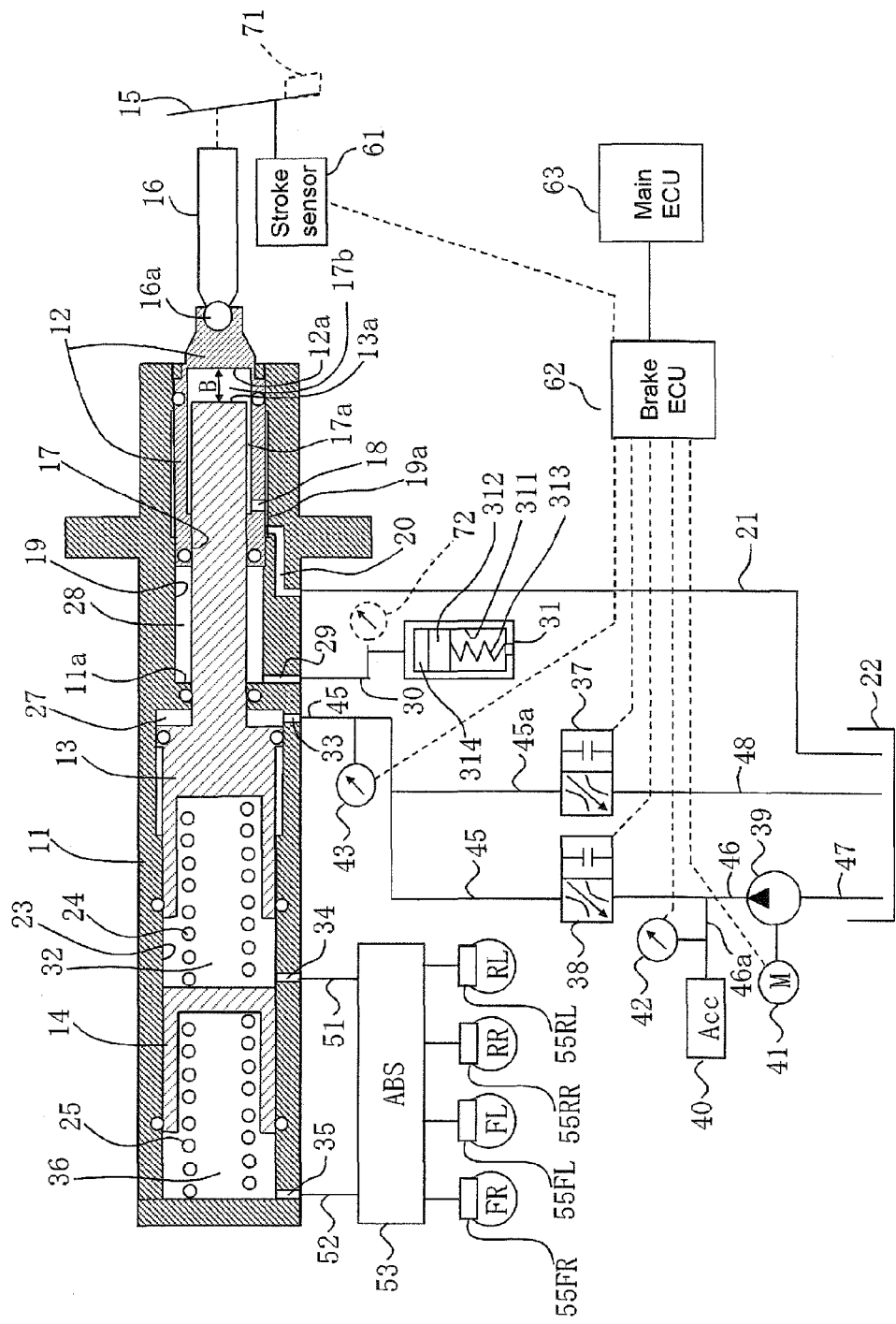
FIG. 1 is view showing a braking control device for a vehicle according to an embodiment of the invention.

The braking control device for a vehicle according to the invention is mounted on a vehicle such as an HV (hybrid Vehicle). As shown in FIG. 1, the braking control device includes a cylinder 11 base end thereof being open and the tip end thereof being closed. An input piston 12, first and second output pistons 13 and 14 are inserted into the inside of the cylinder in order from the base end and are coaxially disposed the pistons are slidable in an axial direction. The input piston 12 is arranged and a portion thereof is extending outwardly from the base end. The extending portion of the input piston 12 is connected to an operating rod 16 via a pivot 16a. The operating rod 16 is operatively connected to a brake pedal 15. The input piston 12 is movable in response to the operation (depression) of the brake pedal 15 by an operator of the vehicle. The displacement amount of the brake pedal 15 is also referred to as the brake operating amount.

The input piston 12 is slidably engaged with an input cylinder bore 19 formed at the base end side of the cylinder 11. The input piston 12 is provided with an axial bore 17 at the insertion portion for inserting the input piston into the input cylinder bore 19. The axial bore 17 is open at the tip end side and is closed at the base end side to form a closed end surface 12a. A columnar shaped rod portion of the first output piston 13 extending therefrom towards the base end side, penetrating through a partition wall 11a of the cylinder 11 is slidably engaged with the axial bore 17. The end surface 13a of the rod portion is arranged in parallel with the closed end surface 12a and a predetermined distance B between the end surface 13a and the closed end surface 12a is kept constant under the brake pedal 15 being not operated.

A reaction force hydraulic pressure chamber 28 is formed between the tip end side surface of the input piston 12 and the partition wall 11a and in the vicinity of the partition wall 11a a port 29 which penetrates through the peripheral wall of the cylinder 11 and is exposed outside thereof. The port 29 is connected to a pressure increase simulator 31 via a conduit 30.

The pressure increase simulator 31 is provided with a cylinder 311, a piston 312 slidably engaged with the cylinder 311 and a hydraulic pressure chamber 314 is formed in the cylinder at the front side surface of the piston 312 which is always biased in a front direction by a compression spring 313. The hydraulic pressure chamber 314 is connected to the reaction force hydraulic pressure chamber 28 via the conduit 30. Upon the depression (operation) of the brake pedal 15, the input piston 12 is advanced (moved forward) to drive the operating fluid in the reaction force hydraulic pressure chamber 28 to be introduced into the hydraulic pressure chamber 314. Then the piston 312 is retreated by overcoming the spring force generated proportion to the deflection amount of the compression spring 313. Then the pressure in the reaction force hydraulic pressure chamber 28 increases according to the brake operating amount (displacement amount) of the brake pedal 15 to apply a corresponding reaction force to the brake pedal 15. It is noted that a pressure sensor 72 may be provided in the conduit 30 for detecting the pressure in the reaction force hydraulic pressure chamber 28.

A large diameter portion is formed at the axial bore 17 with a predetermined length in an axial direction to form a passage 17a having a predetermined gap along in an axial direction between the inner peripheral surface of the axial bore 17 of the input piston 12 and the outer peripheral surface of the rod portion of the first output piston 13. A penetrating bore 18 is formed at the peripheral wall of the input piston 12 which penetrates the peripheral wall of the input piston 12 and is connected to the passage 17a. Further, a large diameter portion is formed at the input cylinder bore 19 with a predetermined length in an axial direction to form a passage 19a having a predetermined gap along in an axial direction between the outer peripheral surface of the input piston 12 and the inner peripheral surface of the input cylinder bore 19. A passage 20 having a crank shape in cross section is formed at the peripheral wall of the cylinder 11 and the passage 20 penetrates through the cylinder wall to be in communication with the passage 19a around the tip end thereof. The passage 20 is connected to a reservoir tank 22 for reserving the operating fluid therein via a conduit 21.

Accordingly, a gap (distance) portion 17b formed between the end surface 13a and the closed end surface 12a is connected to the reservoir tank 22 through the passage 17a, penetrating bore 18, passage 19a, passage 20 and the conduit 21. This communication is kept regardless of the operating amount of the brake pedal and the gap portion 17b is always exposed to the atmosphere.

In the cylinder 11, a pressure increase cylinder bore 23 is formed by sandwiching the input cylinder bore 19 and the partition wall 11a. The first output piston 13 is reverse C-shaped and is slidably engaged with the pressure increase cylinder bore 23. The second output piston 14 is reverse C-shaped and is disposed at the tip end side of the first output piston 13 and is slidably engaged with the pressure increase cylinder bore 23.

An operating hydraulic pressure chamber 27 is formed between the partition wall 11a and the first output piston 13. A first pressure chamber 32 is formed between the first output piston 13 and the second output piston 14. A second pressure chamber 36 is formed between the second output piston 14 and the closed tip end surface of the pressure increase cylinder bore 23. A first compression spring 24 is interposed between the bottom surface of the recessed portion of the first output piston 13 and a rear end surface of the second output piston 14 and a second compression spring 25 is interposed between the bottom surface of the recessed portion of the second output piston 14 and the closed tip end surface of the pressure increase cylinder bore 23. Accordingly, when the brake pedal 15 is not operated, the first and the second output pistons 13 and 14 are biased in the base end side direction of the cylinder 11 by the spring force of the first and the second compression springs 24 and 25 to be stopped to the respective predetermined inoperative positions.

Under a state that the brake pedal 15 is not operated, the end surface 13a of the rod portion of the first output piston 13 is kept to a separated state with the closed end surface 12a of the input piston 12 with a gap having the distance B above. If the operator of the vehicle depresses the brake pedal 15 to advance the input piston 12 by a relative distance B relative to the first output piston 13, the input piston 12 then is brought into contact with the first output piston 13 to be able to move the same in an advancing direction.

A port 33 is provided in the vicinity of the partition wall 11a of the operating hydraulic pressure chamber 27. The port 33 is penetrating through the peripheral wall of the cylinder 11 to extend towards the exterior of the cylinder. A port 34 is formed at the first pressure chamber 32 which is formed between the first output piston 13 and the second output piston 14 in the vicinity of the rear end surface of the second output piston 14 positioned at a predetermined inoperative position. The port 34 is penetrating through the cylinder peripheral wall of the cylinder 11 and exposed to the outside of the cylinder. Further, a port 35 is provided at the second pressure chamber 36 which is formed between the tip end side of the second output piston 14 and the closed tip end surface of the cylinder 11 in the vicinity of the closed tip end surface. The port 35 is penetrating through the cylinder peripheral wall of the cylinder 11 and exposed to the outside of the cylinder.

Between the port 33 of the operating hydraulic pressure chamber 27 and the reservoir tank 22, a pressure decrease linear valve 37, a pressure increase linear valve 38, hydraulic pressure pump 39 and an accumulator (Acc) 40 are connected via the pressure supply conduits (merely referred to as "conduits") 45, 45a, 46, 46a, 47, and 48. In other words, the port 33 is connected to the conduit 45 and an outlet port of the pressure increase linear valve 38 is connected to the tip end of the conduit 45 and an inlet port of the pressure increase linear valve 38 is connected to a discharge port of the hydraulic pressure pump 39 via the conduit 46. A suction port of the hydraulic pressure pump 39 is connected to the reservoir tank 22 via the conduit 47. A motor 41 for driving the hydraulic pressure pump 39 is connected to the hydraulic pressure pump 39. The conduit 46 which connects the hydraulic pressure pump 39 and the motor 41 for driving the hydraulic pressure pump 39 is branched off on the way and the accumulator 40 is connected to the branched conduit 46a of the conduit 46. Similarly, the conduit 45 which connects the pressure increase linear valve 38 and the port 33 is branched off on the way and the inlet port of the pressure decrease linear valve 37 is connected to the branched conduit 45a. The outlet port of the pressure decrease linear valve 37 is connected to the reservoir tank 22 via the conduit 48.

A pressure sensor 42 is provided in the conduit 46a which is connected to the inlet/outlet ports of the accumulator 40 for detecting pressure energy (accumulated pressure) accumulated in the accumulator 40. Another pressure sensor 43 is provided in the conduit 45 which is connected to the port 33 of the operating hydraulic pressure chamber 27 for detecting the hydraulic pressure in the operating hydraulic pressure chamber 27.

The accumulator 40 serves as an accumulator for accumulating the hydraulic pressure generated by the hydraulic pressure pump 39 and the accumulated pressure is supplied to the operating hydraulic pressure chamber 27 via the pressure increase linear valve 38 to obtain a braking force. When the accumulated pressure is detected to be lower than a predetermined value by the pressure sensor 42, the hydraulic pressure pump 39 is driven by the motor 41 to supply the accumulator 40 with the operating fluid to supplement the accumulated pressure energy in the accumulator 40. The accumulator 40 is arranged at an upstream side of the hydraulic pressure pump 39 to dampen the pulsation of the operating fluid (brake fluid) discharged from the hydraulic pressure pump 39.

The pressure decrease and increase linear valves 37 and 38 are of an electromagnetic valve type for adjusting flow rate. The flow rate is adjusted such that when the hydraulic pressure in the operating hydraulic pressure chamber 27 is desired to be raised, the throttling resistance of the pressure increase linear valve 38 is reduced thereby to increase the throttle resistance of the pressure decrease linear valve 37. On the other hand, if the hydraulic pressure in the operating hydraulic pressure chamber is desired to be dropped, the throttling resistance of the pressure increase linear valve 38 is increased thereby to decrease the throttle resistance of the pressure decrease linear valve 37. When the value of the throttle resistance of the pressure increase linear valve 38 is set to be the minimum value and the pressure decrease linear valve 37 is closed, then the assisting limit hydraulic pressure Pm is generated in the operating hydraulic pressure chamber 27. If the pressure increase linear valve 38 is closed and the throttle resistance of the pressure decrease valve 37 is set to be the minimum value, then no hydraulic pressure exists in the operating hydraulic pressure chamber 27. When the assisting limit hydraulic pressure Pm is generated in the operating hydraulic pressure chamber 27, the assisting limit hydraulic pressure braking force Fpm is applied to each wheel FR through RL.

An ABS (Anti-Lock Brake System) 53 is connected to the ports 34 and 36 of the first and the second pressure chambers 32 and 36 through discharge conduits 51 and 52, respectively. Wheel cylinders (55FR, 55FL, 55RR and 55RL) of each brake device (not shown) for braking the corresponding wheels (Front Right FR, Front Left, FL, Rear Right RR and Rear Left RL) is connected to the ABS 53. The hydraulic pressure driven out from the accumulator 40 is controlled to be the operating hydraulic pressure P through the pressure decrease and pressure increase linear valves 37 and 38 generated in the operating hydraulic pressure chamber 27 and the first output piston 13 and accordingly the second output piston 14 are advanced forward to pressurize the hydraulic fluid in the first and the second pressure chambers 32 and 36. The pressurized fluid in the first and second pressure chambers 32 and 36 are supplied to the wheel cylinders 55FR through 55RL as the braking hydraulic pressure via the respective ports 34 and 35 through the discharge conduits 51 and 52 and ABS 53. Thus the brake hydraulic pressure is applied to the vehicle wheels FR through RL to apply braking force to the vehicle.

O-rings (sealing members) are provided between the inner peripheral surface of the input cylinder bore 19 and the outer peripheral surface of the input piston, between the pressure increase cylinder bore 23 and the outer peripheral surfaces of the first and the second output pistons 13 and 14 and between the inner peripheral surface of the axial bore 17 of the input piston 12 and the partition wall 11a and the outer peripheral surface of the rod shaped portion of the first output piston 13. These O-rings are used for sealing the space between the elements to prevent leakage of fluid therefrom. Each O-ring is illustrated in FIG. 1 with a small circle.

The vehicle braking control device further includes a brake ECU (Electronic Control Unit) 62 as a control means. The brake ECU 62 is electrically connected to a stroke sensor 61 provided at the brake pedal 15, the pressure increase linear valve 38, the pressure decrease linear valve 37, pressure sensors 42 and 43 and the motor 41. Further, the brake ECU 62 is connected to a main ECU 63 which executes high-order control to the brake ECU 62. The stroke sensor 61 detects the stroke of the brake pedal 15 and sends the signal to the brake ECU 62. The brake ECU 62 then obtains the brake operating amount S based on the detected pedal stroke.

The brake ECU 62 obtains the target braking force Ft corresponding to the brake operating amount S detected by the stroke sensor 61 from the map of brake operating amount—target braking force. The brake ECU 62 distributes the obtained target braking force Ft to the target regeneration braking force Frt and the target hydraulic pressure braking force Fpt. The brake ECU 62 applies the hydraulic pressure brake (hydraulic pressure braking force) to the vehicle wheels FR through RL according to the target hydraulic pressure braking force Fpt. Similarly, the motor ECU (not shown) applies the regeneration brake (regeneration braking force) to the drive wheels according to the target regeneration braking force Fpt. The motor ECU operates the electric motor (not shown) to serve as a generator generating electric power by the rotation of the drive wheels and applies the regeneration braking force to the drive wheels to decelerate the vehicle speed and converts the motion (rotation) energy into the electric energy. Thus the converted electric energy is recollected to the battery through the inverter (not shown).

Figure 2:
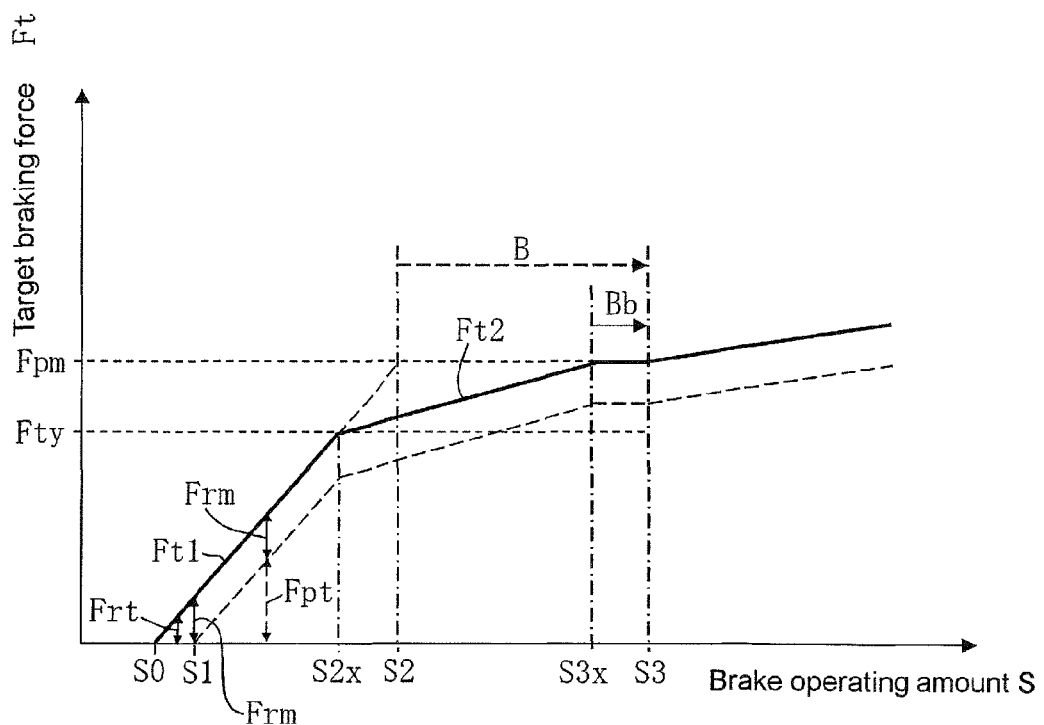
FIG. 2 shows a map for brake operating amount—target braking force, showing a relationship between the brake operating amount and a target braking force according to the braking control device of the embodiment.

It is noted here that under the braking operation being executed and under a state that the regeneration braking is possible and that the target regeneration braking force is greater than zero (0), a regeneration cooperative controlling in which both the hydraulic pressure braking force and the regeneration braking force are applied to the wheels is executed. The target braking force Ft which is a total of the target hydraulic pressure braking force Fpt and the target regeneration braking force Frt is set according to the brake operating amount S. An example of the map illustrating the relationship between the brake operating amount S and the target braking force is shown in FIG. 2. In order to secure a necessary braking force even under a situation that the regeneration braking cannot be performed due to a shortage of battery charge or the like, it is necessary to secure the target braking force relative to the brake operating amount by securing the hydraulic pressure braking force. Accordingly, the map for the relationship between the brake operating amount and the target braking force indicates the target hydraulic pressure braking force relative to the brake operating amount S under the condition that the regeneration braking force is zero (0).

According to the map illustrated in FIG. 2, in the map of brake operating amount—target braking force, the target braking force Ft increases with a desired inclination servo performance relative to the brake operating amount S from the point S0 of the brake operating amount where no stroke play exists for the brake pedal 15 until the point S2x which corresponds to the servo performance change operating amount smaller than the point S2 of the assisting limit operating amount. This assisting limit operating amount S2 is the point of the operating amount that the target braking force Ft becomes the assisting limit hydraulic pressure braking force Fpm according to the set servo performance.

The target braking force Ft increases with the ineffective operating amount reducing servo performance relative to the brake operating amount S after the brake operating amount S exceeds the amount S2x until the brake operating amount reaches the point S3x of the brake operating amount which is smaller than the amount S3 of the brake operating amount or the contact brake operating amount. The value of the ineffective operating amount reducing servo performance can be obtained by dividing the value which is obtained by subtracting the target braking force Ft at the brake operating amount of S2x which corresponds to set servo performance of the servo performance change operating amount from the assisting limit hydraulic pressure braking force Fpm by the value which is obtained by subtracting the servo performance change brake operating amount F2x from the contact brake operating amount S3 or a predetermined brake operating amount S3x which is smaller than the contact brake operating amount S3. The ineffective operating amount reducing servo performance has a performance characteristic that the increase ratio of the hydraulic pressure braking force Fp relative to the increase of the brake operating amount S is smaller than the set servo performance characteristics.

An allowance gap or distance Bb thereafter until the input piston 12 is brought into contact with the output piston 13 is defined to be the ineffective operating amount and when the brake operating amount S exceeds the contact brake operating amount S3, the target braking force Ft increases proportion to the depression amount of the brake pedal 15 by the operator of the vehicle.

The target braking force Ft relative to the brake operating amount S is memorized in the memory of the brake ECU as the map for the relationship between the brake operating amount and the target braking force. Upon the regeneration cooperative controlling where the regeneration braking operation is possible, the brake ECU 62 defines the target regeneration braking force Frt at each brake operating amount S in the range that the regeneration braking operation is possible and defines the target hydraulic pressure braking force Fpt by subtracting the target regeneration braking force Frt from the target braking force Ft.

The brake ECU 62 operates the pressure increase and decrease linear valves 38 and 37 based on the defined target hydraulic pressure braking force Fpt thereby generating operating hydraulic pressure P corresponding to the target hydraulic pressure braking force Fpt in the operating hydraulic pressure chamber 27. Thus the operating hydraulic pressure (braking hydraulic pressure) P is supplied to the wheel cylinders 55Fr through 55RL to apply target hydraulic pressure braking force Fpt to the wheels FR through RL of the vehicle. The motor ECU (not shown) operates the electric motor connected to the drive wheels as a generator based on the target regeneration braking force Frt thereby to apply target regeneration braking force Frt at the drive wheels.

Figure 3:
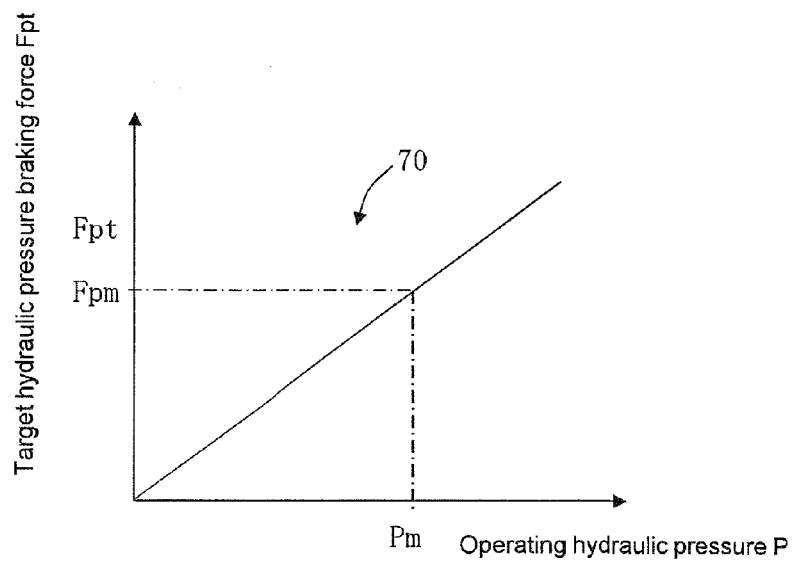
FIG. 3 is a map for an operating hydraulic pressure—hydraulic pressure braking force, showing a relationship between the operating hydraulic pressure and the hydraulic pressure braking force according to the embodiment of the invention.

When the regeneration cooperative controlling is executed, upon depression of brake pedal 15, the target hydraulic pressure braking force is zero (0) until the brake operating amount changes from the amount S0 to S1 and no hydraulic pressure P is generated in the operating hydraulic pressure chamber 27. Under this state, only the regeneration braking operation is performed to apply the target regeneration braking force Frt to the drive wheels in response to the brake operating amount S. After the brake operating amount S detected by the stroke sensor 61 exceeds the brake operating amount S1 in which the target braking force Ft becomes equal to the maximum regeneration braking force Frm, in addition to the maximum regeneration braking force Frm, the target braking force Ft is applied to the wheels of the vehicle since the operating hydraulic pressure Pt corresponding to the target hydraulic pressure braking force Fpt which is obtained by subtracting the maximum regeneration braking force Frm from the target braking force Ft is generated in the operating hydraulic pressure chamber 27. The relationship between the operating hydraulic pressure P generated in the operating hydraulic pressure chamber 27 and the hydraulic pressure braking force Fp applied to the wheels FR through RL is obtained by experimental work or so separately. As shown in FIG. 3, the obtained relationship is stored in the memory of the brake ECU 62 as the map 70 showing the relationship between the operating hydraulic pressure and the hydraulic pressure braking force.

Under the brake pedal 15 being not depressed, the gap between the end surface 13a of the rod shaped portion of the first output piston 13 and the closed end surface 12a of the input piston 12 is kept to be constant (distance B). however, after the hydraulic pressure in the operating hydraulic pressure chamber 27 reaches to the assisting limit hydraulic pressure Pm, the input piston 12 advances according to the increase of the depression amount of the brake pedal 15 and is brought into contact with the first output piston 13 to reduce the gap between the end surface 13a and the closed end surface 12a.

If designed to contact the end surface 13a and the closed end surface 12a when the target braking force Ft becomes the assisting limit hydraulic pressure braking force Fpm, such designing can eliminate the ineffective stroke of the brake pedal 15 that the braking force is not increased even the brake operating amount is increased. However, it would be very difficult to design that the end surface 13a and the closed end surface 12a are brought into contact with each other exactly when the target braking force Ft becomes the assisting limit hydraulic pressure braking force Fpm due to manufacturing errors or elastic deformation of the components. Further, in order to freely design the hydraulic pressure braking force according to the brake operating amount, it is preferable to keep an allowable distance Bb between the end surface 13a and the closed end surface 12a when the target braking force Ft becomes the assisting limit hydraulic pressure braking force Fpt.

According to the embodiment of the invention, the target braking force Ft can be increased in accordance with the brake operating amount S based on the ineffective operating amount reducing performance even the brake operating amount S exceeds the servo performance change operating amount S2x and reaches to the contact brake operating amount S3 or a predetermined brake operating amount S3x which is smaller than the contact brake operating amount S3. Accordingly, after the brake operating amount S reached to the predetermined brake operating amount S3x under the ineffective operating amount reducing servo performance, the ineffective operating amount Bb, by which the braking force is not increased even when the operator of the vehicle depressed on the brake pedal 15, can be minimized so that the operator of the vehicle would not feel unpleasant or uncomfortable feeling.

As explained above, the target braking force Ft increases under the set servo performance which is the servo performance of the hydraulic pressure braking force Fp as the target braking force Ft as shown with the solid line Ft1 in FIG. 2 from the point S0 of the brake operating amount S until the point S2 thereof. When the brake operating amount S reaches to a predetermined servo performance change brake operating amount S2x which value is smaller than the assisting limit brake operating amount S2 under the set servo performance, the servo performance is changed to the ineffective operating amount reducing servo performance and thus the assisting limit brake operating amount S3x where the hydraulic pressure braking force Fp becomes the assisting limit hydraulic pressure braking force Fpm approaches closer to the contact brake operating amount S3. In other words, the predetermined brake operating amount S3x where the hydraulic pressure braking force Fp under the ineffective operating amount reducing servo performance changed from the set servo performance becomes the assisting limit hydraulic pressure braking force Fpm approaches more closer to the contact brake operating amount S3 (contact brake operation position) than the assisting limit brake operating amount S2 where the hydraulic pressure braking force Fp under the set servo performance which has not been changed to the ineffective operating amount reducing servo performance. Accordingly, the ineffective operating amount Bb under the ineffective operating amount reducing servo performance becomes smaller than the ineffective operating amount B where the set servo performance is not changed.

Thus, the ineffective operating amount by which the target braking force is not increased even upon the increase of the brake operating amount and accordingly the braking hydraulic pressure to be supplied to the wheel cylinders 55FR through 55RL is not raised can be reduced not to give any uncomfortable feeling to the operator of the vehicle.

Figure 5:
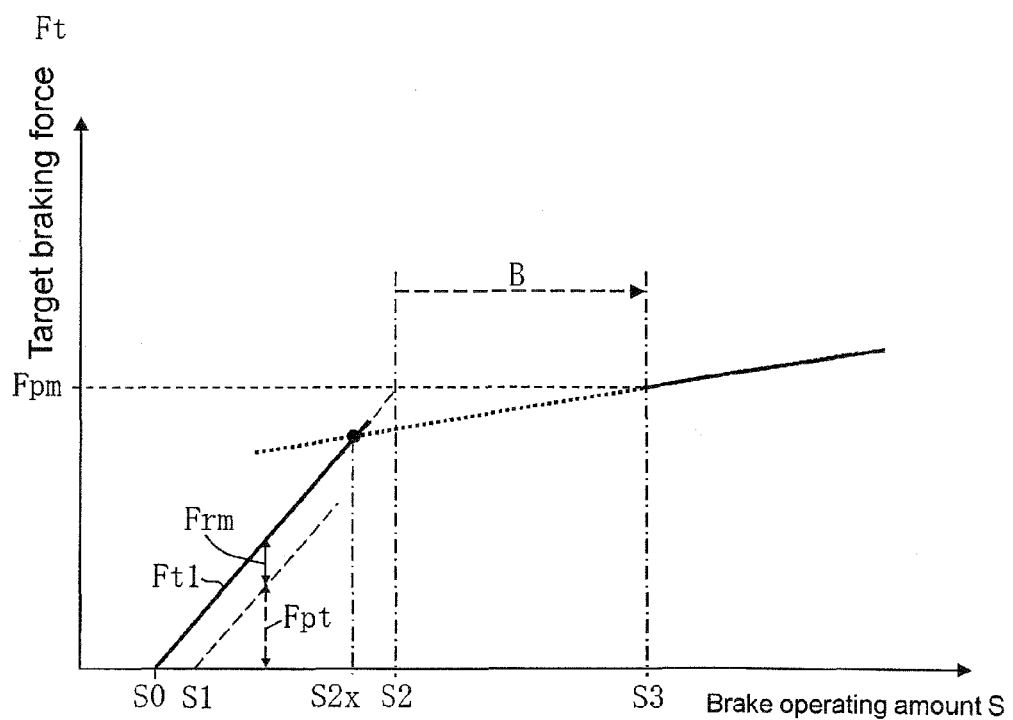
FIG. 5 is a map similar to the map in FIG. 3, but showing a modified embodiment.

A modified embodiment of the invention will be explained hereinafter. In this embodiment, the ineffective operating amount reducing servo performance is set to be the increase ratio of the hydraulic pressure braking force relative to the increase of the brake operating amount S after the contact between the input piston 12 and the output piston 13. As shown in FIG. 5, the brake operating amount S at the intersecting point of the straight line corresponding to the ineffective operating amount reducing servo performance which passes through the coordinate point corresponding to the contact brake operating amount S3 and the assisting limit hydraulic pressure braking force Fpm and the straight line corresponding to the set servo performance may be set to be the servo performance change operating amount S2x. Thus, the ineffective operating amount Bb can be minimized and yet the change ratio of the braking force before and after the contact between the input piston 12 and the output piston 13 can be equalized to improve the brake operability of the vehicle.

Figure 4:
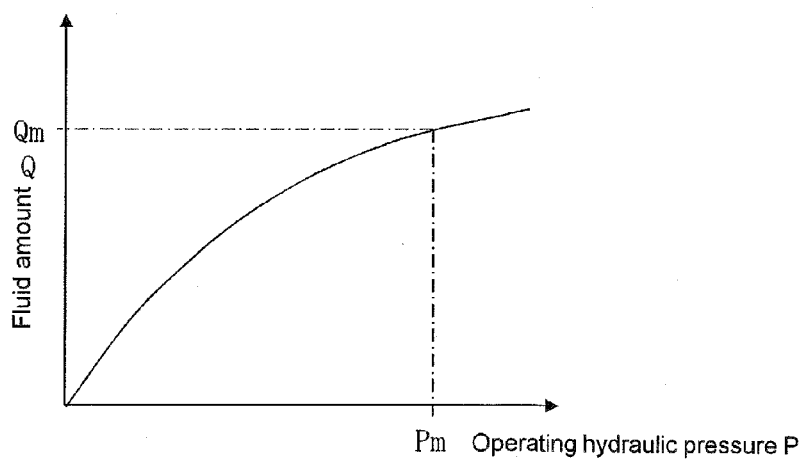
FIG. 4 is a graph showing an operating hydraulic pressure—fluid amount, showing the fluid amount driven out from the cylinder until the operating hydraulic pressure applying to the piston becomes each operating hydraulic pressure.

Next, setting of the ineffective operating amount reducing servo performance will be explained hereinafter. First, the contact brake operating amount S3 is presumed. The actual fluid amount Q driven out from the ejection conduits 34 and 35 relative to the control pressure P generated in the operating hydraulic pressure chamber 27 is measured and the relationship therebetween is illustrated as a graph in FIG. 4. The fluid amount Qm driven out from the conduits 34 and 35 at the assisting limit hydraulic pressure Pm generated in the operating hydraulic pressure chamber 27 is obtained from the graph and the amount Qm is divided by the cross section area of the first and the second pistons 13 and 14. Thus, the displacement amount of the first output piston 13 at the value of the assisting limit hydraulic pressure Pm generated in the operating hydraulic pressure chamber 27 is presumed. The contact brake operating amount S3 is obtained by adding the distance B between the end surface 13a of the first output piston 13 and the closed end surface 12a of the input piston 12 under the brake pedal being not operated to the presumed displacement amount of the first output piston 13. Accordingly, the contact brake operating amount S3 can be easily presumed.

Alternatively, the contact brake operating amount S3 can be presumed based on the change of the operating hydraulic pressure P which influences on or moves the output piston 13 and which is detected by a hydraulic pressure sensor provided in the first pressure chamber 32 or the second pressure chamber 36 for detecting the pressure therein at each detected brake operating amount detected by the stroke sensor. In other words, the brake operating amount S is detected by the stroke sensor 61 and the hydraulic pressure in the first or second pressure chamber 32, 36 is detected by the hydraulic pressure sensor at each detected brake operating amount S. The brake operating amount which initiates the increase from the state that no change occurs can be defined as the contact brake operating amount S3. This can accurately presume the contact brake operating amount S3.

The assisting limit hydraulic pressure braking force Fpm is calculated based on the assisting limit operating hydraulic pressure Pm generated in the operating hydraulic pressure chamber 27 and is detected by the hydraulic pressure sensor 43 from the map 70 in FIG. 3 showing the relationship between the operating hydraulic pressure and the hydraulic pressure braking force when the throttle resistance of the pressure increase liner valve 38 is controlled to be minimized and when the pressure decrease liner valve 37 is controlled to be closed.

The ineffective operating amount reducing servo performance is obtained by dividing the value (Fpm−Fty) obtained by subtracting the target braking force Fty at the servo performance change brake operating amount S2x under the set servo performance from the assisting limit hydraulic pressure braking force Fpm by the value (S3−S2x) or (S3x−S2x) obtained by subtracting the servo performance change brake operating amount S2x from the contact brake operating amount S3 or from the predetermined brake operating amount S3x which value is smaller than the contact brake operating amount S3. According to this calculation, the brake operating amount S when the target braking force Ft becomes the assisting limit hydraulic pressure braking force Fpm can be set to be close to the value of the contact brake operating amount S3 to thereby appropriately reduce the ineffective operating amount Bb.

Further, it is judged whether the brake operating amount S exceeds the assisting limit operating amount S2 or not based on the change ratio of the brake operating amount S until the brake operating amount S reaches to the servo performance change operating amount S2x. When it is judged that the brake operating amount S exceeds the assisting limit operating amount S2, the servo performance is changed from the set servo performance to the ineffective operating amount reducing servo performance at the point of servo performance change operating amount S2x and on the other hand if it is judged that the brake operating amount S does not exceed the assisting limit operating amount S2, then the servo performance is not changed keeping the set servo performance.

Figure 6:
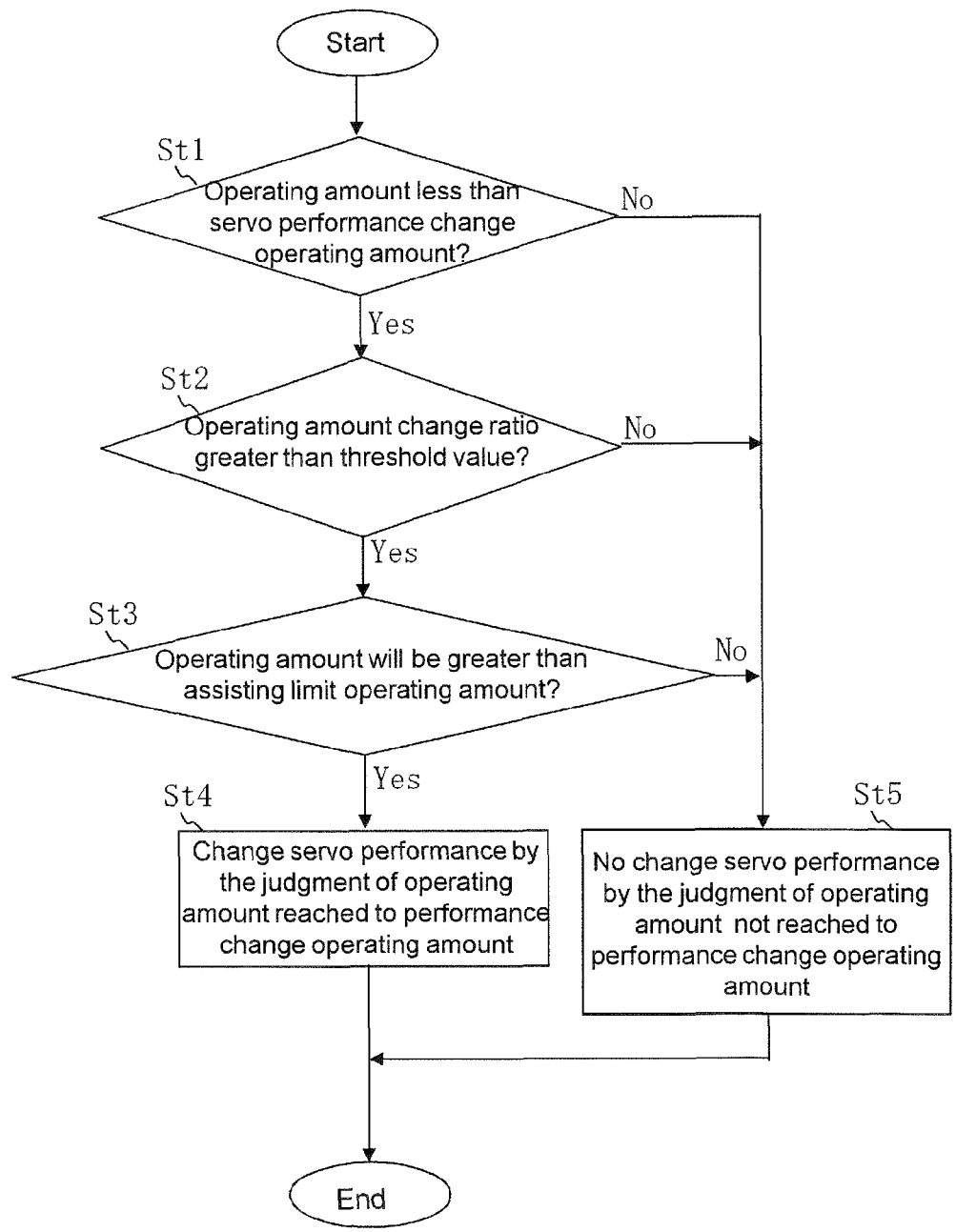
FIG. 6 is a flowchart for processing not to change the set servo performance to the ineffective operating amount reducing servo performance when the brake operating amount does not exceed the assisting limit operating amount.
Figure 7:
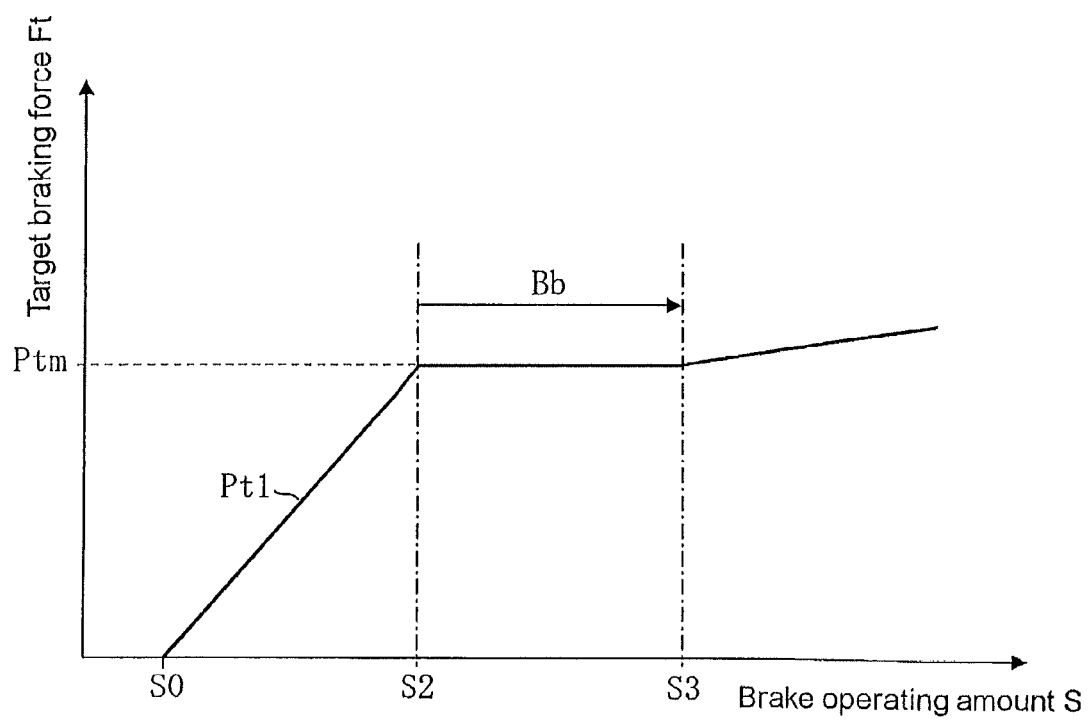
FIG. 7 shows a relationship between the brake operating amount and the braking force according to a conventional device.

IN the flowchart of FIG. 6, the brake ECU 62 judges whether or not the brake operating amount S exceeds the servo performance change operating amount S2x at the step St1. If the judgment result is that the brake operating amount S is less than the servo performance change operating amount S2x, then at the step St2 the change ratio of the brake operating amount S is calculated and it is judged whether the change ratio is equal to or more than a threshold value and is larger than the threshold value, then at the step St3, it is judged that the brake operating amount S will exceed the assisting limit operating amount S2 and at the step St4, the servo performance is changed from the set servo performance to the ineffective operating amount reducing servo performance when the brake operating amount S reached to the servo performance change operating amount S2x. On the other hand, at the step St3, if judged that the brake operating amount S will not exceed the assisting limit operating amount S2, at the step St5, the servo performance change is not performed. It is noted that at the step St2, in addition to the calculation of the change ratio of the brake operating amount S, the change ratio of the operating hydraulic pressure P can be calculated and judges whether the change ratio of the brake operating amount S and the operating he hydraulic pressure P exceeds threshold value.

According to this method explained above, when the brake pedal 15 is depressed and if the operating amount S exceeds the assisting limit operating amount S2, the ineffective operating amount can be reduced and if the operating amount S does not exceed the assisting limit operating amount S2, the servo performance is not changed and accordingly, the hydraulic pressure braking force can be increased according to the brake operating amount S.

In the structure explained above, it may be changed that instead of using the stroke sensor 61, a depression force sensor 71 of the brake pedal 15 may be used for detecting the depression force value or a hydraulic pressure sensor 72 for detecting the pressure value in the pressure increase simulator 31 may be used to obtain the brake operating amount. Further, it may be possible to use any combination of the pedal stroke detected by the stroke sensor 61, depression force value detected by the depression force sensor 71 and the pressure value detected by the hydraulic pressure sensor 72 of the pressure increase simulator 31.

APPLICABILITY FOR INDUSTRY

The braking control device for a vehicle, as explained, is applicable to a vehicle braking control device having an ineffective operating amount by which the braking force for the vehicle is not raised regardless of the increase of the brake operating amount.

EXPLANATION OF REFERENCE NUMERALS

In the drawings:
11: cylinder, 11a: partition wall, 12: input piston, 12a: closed end surface, 13: first output piston, 13a: end surface of the rod shaped portion, 14: second output piston, 15: brake pedal, 16: operating rod, 17: axial bore, 19: input cylinder bore, 22: reservoir tank, 23: pressure increase cylinder bore, 24: first compression spring, 25: second compression spring, 28: reaction force hydraulic pressure chamber, 30: conduit, 32: first pressure chamber, 36: second pressure chamber, 37: pressure decrease linear valve, 38:

pressure increase linear valve, 39: hydraulic pressure pump, 40: accumulator, 42, 43, 72: hydraulic pressure sensor, 45, 46, 47, 48: hydraulic pressure supply conduit, 51, 52: ejection conduit, 53: ABS, 55Fr, 55FL, 55RR and 55RL: wheel cylinders, 61: stroke sensor, 62: brake ECU, 63: main ECU 63, 71: depression force sensor.

The invention claimed is:

1. A braking control device for a vehicle adapted to a vehicle brake device comprising:
    a master cylinder having an input piston which is slidable in a cylinder portion in cooperation with an operation of a brake operating member and an output piston which is slidable in the cylinder portion by contacting with or separating from the input piston by the operation of the brake operating member;
    a driving hydraulic pressure adjusting device connected to a driving hydraulic pressure chamber formed in the master cylinder for adjusting a driving hydraulic pressure in the driving hydraulic pressure chamber so as not to exceed a predetermined assisting limit hydraulic pressure wherein
    a master hydraulic pressure in a master hydraulic pressure chamber formed in the master cylinder varies when the output piston slidably moves within the cylinder portion by the driving hydraulic pressure under a state that the input piston is separated from the output piston and the master hydraulic pressure varies when the input piston and the output piston slidably move within the cylinder portion in cooperation with the operation of the brake operating member under a state that both input and output pistons are in contact with each other and wherein
    the driving hydraulic pressure adjusting device is controlled to adjust the driving hydraulic pressure so that the output piston is separated from the input piston when the driving hydraulic pressure is below the predetermined assisting limit hydraulic pressure;
    a brake operating amount detecting portion for detecting an operating amount of the brake operating member; and
    a driving hydraulic pressure control means for performing an ineffective operating amount reducing servo performance which controls the driving hydraulic pressure by the driving hydraulic pressure adjusting device based on a first servo performance which is a predetermined value of an increased amount of the driving hydraulic pressure relative to an increased amount of a brake operating amount when the brake operating amount which is the operating amount of the brake operating member detected by the brake operating amount detecting means is below a predetermined servo performance change operating amount and controls the driving hydraulic pressure by the driving hydraulic pressure adjusting device based on a second servo performance in which the increased amount of the driving hydraulic pressure relative to the increased amount of the brake operating amount is smaller than the first servo performance, until the driving hydraulic pressure becomes the predetermined assisting limit hydraulic pressure before the input piston is brought into contact with the output piston when the brake operating amount is equal to or more than the servo performance change operating amount, so as to reduce an ineffective operating amount which is an increase of the operating amount of the brake operating member from a point where the driving hydraulic pressure reaches the predetermined assisting limit hydraulic pressure to a contact brake operating amount where the input piston is brought into contact with the output piston in the ineffective operating amount reducing servo performance, wherein
    the servo performance change operating amount is a smaller operating amount than an assisting limit operating amount, wherein the assisting limit operating amount is a braking operating amount of the brake operating member at which the driving hydraulic pressure becomes the predetermined assisting limit hydraulic pressure if the driving hydraulic pressure is controlled based on the first servo performance without changing to the second servo performance at the servo performance change operating amount.

2. The braking control device according to claim 1, further comprising:
    a second servo performance setting means for setting a value of the second servo performance by calculating a pressure differential by subtracting the driving hydraulic pressure corresponding to the servo performance change operating amount from the assisting limit hydraulic pressure, calculating operating amount difference by subtracting the servo performance change operating amount from a contact brake operating amount which corresponds to the operating amount of the brake operating member from the state that the input piston is separated from the output piston to a time when the input piston is brought into contact with the output piston and dividing the pressure differential by the operating amount difference wherein
    the driving hydraulic pressure control means performs a driving hydraulic pressure controlling whereby the brake operating amount is equal to or more than the servo performance change operating amount, based on the value of the second servo performance set by the second servo performance setting means.

3. The braking control device for a vehicle according to claim 2 further comprising a servo performance change operating amount setting means for setting the brake operating amount at an intersection between a performance line at the driving hydraulic pressure controlling based on the first servo performance and a performance line under the state that the input piston is in contact with the output piston under a performance relationship between the brake operating amount and the master hydraulic pressure as the servo performance change amount, wherein the driving hydraulic pressure control means performs the driving hydraulic pressure controlling based on the servo performance change operating amount set by the servo performance change operating amount setting means.

4. The braking control device according to claim 2, further comprising:
    a master hydraulic pressure detecting means for detecting the master hydraulic pressure; and
    a contact brake operating amount calculating means for calculating the contact brake operating amount based on the increased amount of the master hydraulic pressure detected by the master hydraulic pressure detecting means relative to the increased amount of the brake operating amount, wherein
    the second servo performance setting means sets the second servo performance based on the contact brake operating amount calculated by the contact brake operating amount calculating means.

5. The braking control device according to claim 2, further comprising:
    a master hydraulic pressure detecting means for detecting the master hydraulic pressure; and a contact brake operating amount calculating means for calculating the contact brake operating amount by calculating a fluid amount of a brake fluid driven out from the master hydraulic pressure chamber based on the master hydraulic pressure detected by the master hydraulic pressure detecting means and adding a predetermined value to a value obtained by dividing the fluid amount by a cross-section area of the output piston, wherein the second servo performance setting means sets the second servo performance based on the contact brake operating amount calculated by the contact brake operating amount calculating means.

6. The braking control device according to claim 1 further comprising:

a judging means for judging whether the brake operating amount will exceed the assisting limit operating amount or not based on a change ratio of the brake operating amount, wherein the driving hydraulic pressure control means changes the servo performance from the first servo performance to the second servo performance at the point of servo performance change operating amount when the judging means judges that the brake operating amount will exceed the assisting limit operating amount and does not change the servo performance from the first servo performance to the second servo performance when the judging means judges that the brake operating amount will not exceed the assisting limit operating amount.

* * * * *